3,545,846
COMPENSATING OPHTHALMOMETER
Karl-Heinz Wilms, Dachau, Germany, assignor to Optische Werke G. Rodenstock, Munich, Germany
Filed Nov. 6, 1967, Ser. No. 680,725
Claims priority, application Germany, Nov. 4, 1966, O 12,058
Int. Cl. A61b 3/10
U.S. Cl. 351—13          6 Claims

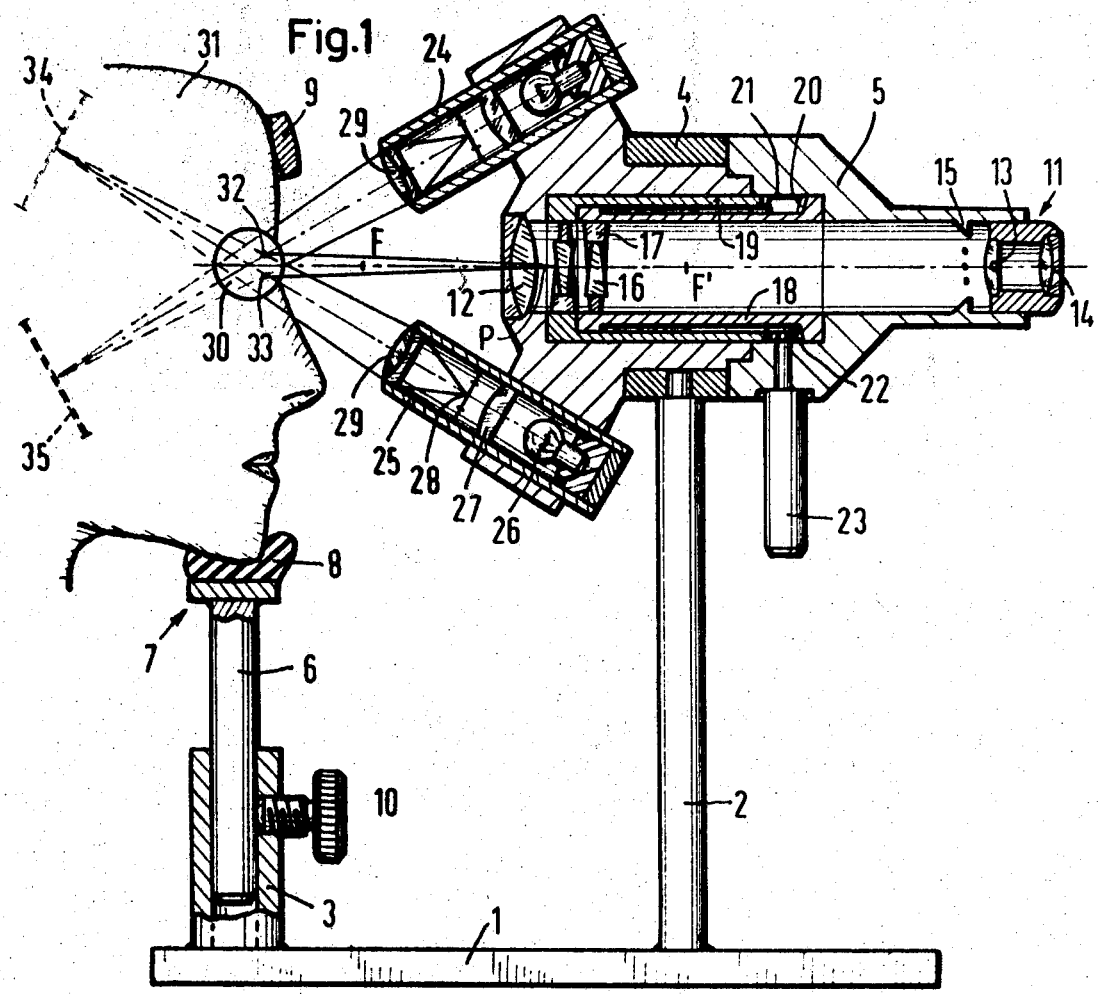

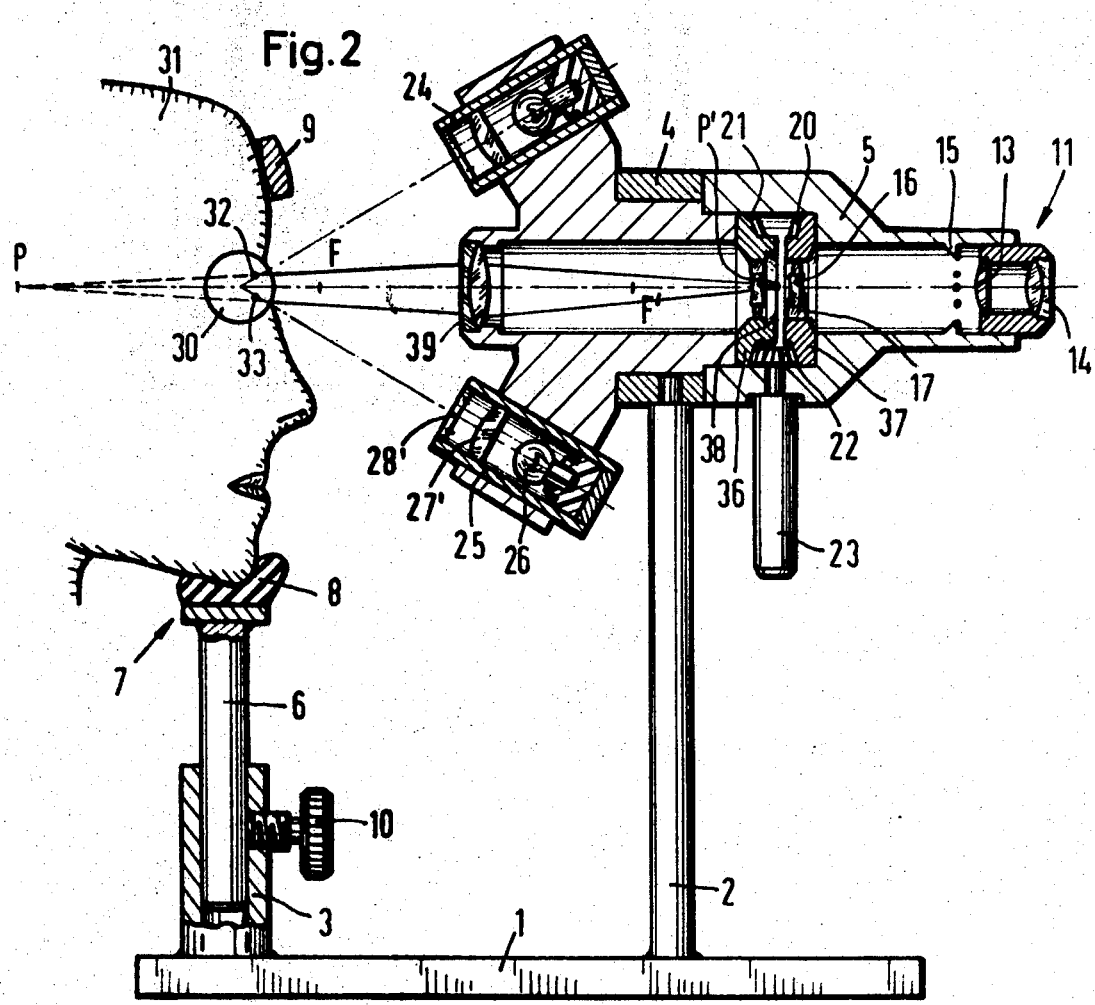

ABSTRACT OF THE DISCLOSURE

A compensating ophthalmometer in which the head rest and the measuring microscope for measuring the apparent spacing of virtual images of two test marks or mires reflected by the tested cornea are arranged and located in such a manner that the planes in which real images of the test marks are projected in the absence of the tested eye are so far behind the position of the cornea as the entrance pupil of the microscope is before the cornea. If the test marks are luminous and directly viewed by the tested eye, the entrance pupil of the microscope is located as far behind the cornea as the test marks are located forward of the position of a cornea determined by the head rest. No significant errors in the measured curvature of the cornea occurs when the cornea deviates from the nominal position between the microscope pupil and the test marks or their real images by as much as 10% of the nominal distance.

BACKGROUND OF THE INVENTION

This invention relates to ophthalmometers, and particularly to improviments in ophthalmometers of the Javal type.

Ophthalmometers are employed mainly for measuring the radius of curvature of the cornea in the human eye. Two luminous test marks are presented to the tested eye either directly or through a projection system, and the apparent distance between the virtual images of the test marks produced by the cornea is determined by means of a measuring microscope. If the distance between the microscope and the tested eye is fixed, the distance reading between the test marks imaged on the cornea is a direct measure of the curvature of the cornea. Ophthalmometers are normally equipped with an image doubling coincidence system which permits the two images of the test marks seen in the microscope ocular to be shifted until they marginally coincide. The condition of the coincidence system then indicates the radius of curvature of the cornea in a properly operated and calibrated ophthalmoscope.

It is difficult to maintain a fixed distance between the tested cornea and the microscope objective, and any movement of the cornea away from its nominal position in the direction of the microscope axis changes the magnification of the microscope and therefore introduces errors in the curvature readings. The known devices for fully overcoming this problem are complex and accordingly costly.

The object of the invention is the provision of a Javal type ophthalmometer compensated in such a manner thtat relative movement of the tested eye and the microscope in the direction of the microscope axis is permissible within limits wide enough to cover all usual conditions, although the ophthalmometer is simple and not significantly more costly than an instrument not compensated in the manner referred to.

SUMMARY OF THE INVENTION

It has been found that the spacing between eye and microscope is not critical when the nominal distance between the tested cornea and the entrance pupil of the microscope is equal to the distance between the position of the cornea and the real projected image of each test mark, if the test marks are projected, or the actual test marks if they are directly viewed by the tested eye.

In an ophthalmometer of the invention equipped with two projection systems for the respective test marks, the projection systems are arranged to project real images of the test marks a distance behind the nominal position of the cornea as determined by the head rest. This distance is equal within ±10% to the distance between the cornea position and the entrance pupil of the microscope.

Because of the permissible 10% tolerance in the relative location of the cornea and the projection planes and entrance pupils, the head rest and the entrance pupil may be prevented by fixed mounting devices from moving relative to each other in the direction of the microscope axis.

If luminous test marks are directly presented to the tested eye, the entrance pupil of the microscope, in the absence of the tested head, is located behind the position of the tested cornea within ±10% of the distance between the cornea position and each of the two luminous marks.

Other features, additional objects, and many of the attendant advantages of this invention will readily become apparent from the following description of preferred embodiments, when considered in conection with the attached drawing.

BRIEF DESCRIPTION OF THE DRAWING

In the drawing:

FIG. 1 shows a first opthalmometer of the invention in side elevational section on its optical axes; and FIG. 2 shows a second ophthalmometer of the invention in a view corresponding to that of FIG. 1.

DESCRIPTION OF THE PREFERRED EMBODIMENTS

Referring now to the drawing in detail, and initially to FIG. 1, there is seen a compensating ophthalmometer of the invention whose operating elements are supported on a base 1 from which a fixed upright bar 2 and a fixed tubular column 3 rise. A ring 4 pivotable on the bar 2 about a vertical axis rotatably receives the housing 5 of a measuring microscope having a horizontal optical axis but prevents axial movement of the housing. A bar 6 which carries a head rest 7 having a chin portion 8 and a forehead portion 9 is received in the column 3 for vertical movement and may be fixed in an adjusted position by means of a set screw 10.

The optical system of the microscope in the housing 5 includes an ocular 11 and an objective 12. The barrel of the ocular 11 holds a cemented doublet 14 consisting of a plano-concave lens and a biconvex lens and a simple planoconvex lens 13 air-spaced forwardly from the doublet 14. The objective 12 is a positive doublet lens similar to the doublet 14. The planar faces of the doublets 12, 14 are directed outwardly.

A field stop 15 is arranged in the housing 5 near the ocular 11, and an image doubling coincidence device is interposed between the objective 12 and its rear focal point F'. The coincidence device is of the type disclosed in Pat. No. 2,733,634. It consists essentially of two prismatic discs 16 mounted in concentric rings 17 which are arranged on coaxial sleeves 18, 19. Gear rims 20, 21 on the sleeves 18, 19 are engaged by the same bevel gear 22 in such a manner that the sleeves are rotated about the optical axis of the miscroscope in opposite directions when a handle 23 on the bevel gear 22 is turned. The angular position of the handle 23 on the housing 5 can be read from indicia, not shown.

Two arms on the housing 5 carry two cylindrical barrels 24, 25 each of which encloses a projection system essentially consisting of an electric lamp 26, a condenser lens 27, a plate 28 carrying a transparent test mark or mire, and an objective lens 29 which is a cemented doublet similar to the aforedescribed doublet 14, and having an outwardly directed convex face. The optical axes of the microscope and of the two projection systems are fixedly arranged in a common plane, and the two projection systems are symmetrical relative to the microscope axis so that the axes of the projection systems obliquely intersect the optical axis of the microscope in one point which is located in an eye 30 of a person whose head 31 is supported on the properly adjusted head rest 7.

Virtual spaced images 32, 33 of the test marks on the plates 28 are formed by the convex outer surface of the cornea on the eye 30, and are viewed by the miscroscope. The spacing of the images 32, 33 together with the distance between the cornea and the entrance pupil of the microscope is a measure of the cornea curvature. The spacing between the cornea of the eye 30 in FIG. 1 and the virtual images 32, 33 has been exaggerated in FIG. 1 for the convenience of pictoral representation. For the purpose of this discussion, the images are located practically in the cornea.

The projection objectives 29 are chosen in such a manner that, in the absence of the head 31, they project real images of the test marks on the plates 28 in planes 34, 35 which are as far behind the normal location of the cornea as the entrance pupil P of the miscrscope near the objective 12 is located in front of the cornea. In the illustrated embodiment, this distance is nominally 20 cm., but useful readings are obtained when the head 31 moves 2 cm. forward or rearward from its optimum position, that is, by 10 percent of the nominal design distance.

The ophthalmometer illustrated in FIG. 1 is operated in the manner conventional with Javal type ophthalmometers. The handle 23 is turned until the images produced by the image doubling or coincidence device 16, 17 assume a relationship for which the instrument is calibrated. The images in the illustrated device consist of paired dots, and the handle 23 is turned until one dot of one pair coincides with one dot of the other pair so that three dots are seen in the ocular 11, the dots being shown in the plane of the field stop 15.

When the head 31 is moved away from the entrance pupil of the microscope, the size of the images viewed by the observer decreases. Simultaneously, however, the apparent distance of the images from each other is also decreased. The two changes affect the angular displacement of the handle 23 necessary for superimposing marginal features of the two images in opposite directions, and balance each other adequately as long as the position of the reflecting cornea remains close to that in which the distance between the cornea and the projection planes of the objectives 29 is equal to that between the cornea and the entrance pupil of the microscope, the permissible deviation of the cornea location being ±10% of the nominal distance.

It is not necessary in the ophthalmometer of this invention to precisely adjust the distance between the eye and the microscope. A small set of interchangeable head rests 7 may be employed for compensating for gross differences in head size, but the relative axial position of the front portion of the miscrscope and of the head rest does not need adjustment, and both may be mounted in axially fixed position, as is shown in FIG. 1.

The modified ophthalmoscope illustrated in FIG. 2 is similar to that described above with reference to FIG. 1, and corresponding elements have been provided with the same reference numerals. They include a base 1, a fixedly mounted upright bar 2 on which a miscroscope housing 5 is secured against axial movement in a ring 4 which permits rotation of the housing about the horizontal optical axis of the miscroscope. A fixedly mounted, upright, tubular column 3 and a rod 6 hold a head rest 7 in vertically adjustable position, and thus define the position of an eye 30 in a supported head 31.

The miscrscope housing 5 encloses an ocular 11, a field stop 15 adjacent the ocular, and an image doubling system including two prismatic discs 16 held in rings 17. The annular mounts 36, 37 in which the two discs 16 are respectively arranged are coaxially rotated in the housing 5 in opposite directions by engagement with a bevel gear 22 actuated by a handle 23. The mount 36 is provided with a field stop 38 in a plane P′ between the two discs 16. The front element 39 of the microscope objective is a positive doublet. The entrance pupil P of the microscope whose location is determined by that of the stop 38 is on the far side of the head rest 7 and of the normal position of the eye 30, as indicated in FIG. 2 in broken lines, and the rear focal point F′ of the element 39 is located in front of the image doubling device 16, 17.

The housing 5 carries two cylindrical barrels 24, 25 whose axes intersect each other in the optical axis of the microscope. The light of a lamp 26 in each barrel is directed by a condenser lens 27′ through a plate 28′ which carries the usual transparent or translucent test marks or mires.

The nominal distance between the luminous test marks on the plates 28′ and the position of the cornea of the eye 30 is equal to the nominal distance between the cornea and the entrance pupil P of the microscope. The actual distances may vary by ±10% without significantly affecting the accuracy of the cornea curvature reading derived from the relative angular position of the handle 23 and the housing 5 in a conventional manner. In the device illustrated in FIG. 2, the nominal distance is 20 cm. and useful readings are obtained if the position of the cornea on the eye 30 is defined by the head rest 7 within ±2 cm. of the nominal position.

As the head 31 moves away from the axially fixed front portion of the microscope housing 5, the virtual images 32 move closer toward each other, but become smaller so that the angular displacement of the handle 23 necessary for marginal superposition of the images viewed through the ocular 11 remains practically the same as long as the difference between the nominal and the actual distance of the cornea from the plates 28′ or the pupil P is within 10 percent of the nominal value. Similarly, the larger size of the images 32 caused by axial movement of the head 31 toward the microscope housing 5 is compensated for by the wider spacing of the images.

What is claimed is:
1. In an ophthalmoscope having
a support;
a head rest including means for holding a head and for holding a tested cornea of an eye in said head in an approximately fixed position relative to said head rest;
a measuring microscope having an optical axis and an entrance pupil;
two noncollimating projecting means having respective optical axes for projecting real images of two test marks in respective projection planes perpendicular to the optical axes of the corresponding projecting means; and
mounting means mounting said head rest, said microscope, and said two projecting means on said support in respective positions in which
the optical axis of the microscope is directed toward a cornea held by said head rest,
said entrance pupil is spaced from said held cornea a first distance in a direction toward said microscope,
said optical axes of the two projecting means in- tersect each other in a common plane with the optical axis of said microscope and intersect said held cornea, said microscope including coincidence means for measuring the apparent distance of virtual images of said two test marks formed by said held cornea;

the improvement in said mounting means which comprises: means for holding said head rest, said microscope, and said projecting means in a fixed spatial relationship in which each of said projection planes is spaced from said held cornea a second distance in a direction away from said projection means, said second distance differing from first distance by not more than ±ten percent.

2. In an ophthalmometer as set forth in claim 1, said microscope having an objective including a positive objective lens, said lens defining the position of said entrance pupil.

3. In an ophthalmoscope having
a support;
a head rest including means for holding a head and for holding a tested cornea of an eye in said head in an approximately fixed position relative to said head rest;
a measuring microscope having an optical axis and an entrance pupil;
two presenting means defining respective luminous test marks; and mounting means mounting said head rest, said microscope, and said presenting means on said support in respective positions in which
the optical axis of said microscope is directed toward a tested cornea held by said head rest,
said test marks are presented to said held cornea at a first distance in respective directions defining a common plane with said optical axis and obliquely intersecting said axis in a common point, said microscope including coincidence means for measuring the apparent distance of virtual images of said test marks formed by the tested cornea, the improvement in the mounting means which comprises: means for holding said head rest, said microscope, and said presenting means in a fixed spatial relationship in which said entrance pupil is spaced from said held cornea a second distance in a direction away from said microscope and behind said cornea,, said second distance differing from said first distance by not more than ± ten percent.

4. In an ophthalmometer as set forth in claim 3, means preventing relative movement of at least a portion of said microscope and of said head rest in the direction of the optical axis of the microscope.

5. In an ophthalmometer as set forth in claim 3, said microscope including a field stop defining said location of the entrance pupil.

6. In an ophthalmometer as set forth in claim 3, said microscope including an objective having a front element, said coincidence means being interposed between said front element and the rear focal point of said front element.

References Cited
UNITED STATES PATENTS

| | | | |
|---|---|---|---|
| 1,046,105 | 12/1912 | Pixley | 351—10 |
| 1,750,931 | 3/1930 | Kellner et al. | 351—10 |
| 1,918,540 | 7/1933 | Hartinger | 351—13 |
| 2,110,330 | 3/1938 | Freeman | 351—13 |
| 2,733,634 | 2/1956 | Littmann et al. | 351—10 |

DAVID M. RUBIN, Primary Examiner

P. A. SACHER, Assistant Examiner